United States Patent
Wong et al.

(10) Patent No.: US 6,928,648 B2
(45) Date of Patent: Aug. 9, 2005

(54) METHOD AND APPARATUS FOR A MOBILE MULTIMEDIA JAVA FRAMEWORK

(75) Inventors: Ivan Wong, San Jose, CA (US); Michael Bundschuh, Menlo Park, CA (US); Shuangying Huang, Sunnyvale, CA (US); Babu Srinivasan, San Jose, CA (US); Amith Yamasani, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 581 days.

(21) Appl. No.: 09/930,850

(22) Filed: Aug. 15, 2001

(65) Prior Publication Data

US 2002/0156937 A1 Oct. 24, 2002

Related U.S. Application Data

(60) Provisional application No. 60/285,568, filed on Apr. 20, 2001.

(51) Int. Cl.[7] .............................. G06F 3/00; G06F 9/44; G06F 9/46; G06F 13/00
(52) U.S. Cl. ....................... 719/328; 719/320; 717/110; 717/116
(58) Field of Search ................................ 717/100–119; 719/310, 320, 328, 321

(56) References Cited

U.S. PATENT DOCUMENTS

| 6,138,271 A | * | 10/2000 | Keeley .................... 717/140 |
| 6,480,891 B1 | * | 11/2002 | Chernyak et al. .......... 709/223 |
| 2004/0088710 A1 | * | 5/2004 | Ronkka et al. ............. 718/107 |

OTHER PUBLICATIONS

Travostino et al, Real–Time Local and Remote MACH IPC: Architecture and Design, OSF Research Institute, Apr. 8, 1994.*

Sun Microsystems, Java Media Framework API Guide, Nov. 19th 1999, chapter "Understanding JMF".*

* cited by examiner

*Primary Examiner*—Meng-Al T. An
*Assistant Examiner*—Diem Cao
(74) *Attorney, Agent, or Firm*—Martine Penilla & Gencarella, LLP

(57) ABSTRACT

An invention is provided for creating a mobile multimedia framework API capable of operation in mobile hardware devices is disclosed. All API component access parameters are set to utilize a synchronous programming model. Then, the API components are set to use a pull paradigm, and all master/slave functionality is removed. The resulting mobile multimedia framework API has a memory size of less than 100 kilobytes.

16 Claims, 9 Drawing Sheets

```
javax/media/Manager.java
javax/media/PackageManager.java
javax/media/Player.java
javax/media/Time.java
javax/media/TimeBase.java
javax/media/SystemTimeBase.java
javax/media/MediaLocator.java
```

FIG. 6A

```
javax/media/Control.java
javax/media/Controls.java
javax/media/CachingControl.java
javax/media/GainControl.java
```

FIG. 6B

```
javax/media/PlayerListener.java
javax/media/GainChangeListener.java
```

FIG. 6C

```
media/protocol/Seekable.java
media/protocol/DataSource.java
media/protocol/ContentDescriptor.java
media/protocol/SourceStream.java
```
↙ 512

FIG. 6G

METHOD AND APPARATUS FOR A MOBILE MULTIMEDIA JAVA FRAMEWORK

CROSS REFERENCE TO RELATED APPLICATIONS

This application claims the benefit of U.S. Provisional Patent Application having Ser. No. 60/285,568, filed on Apr. 20, 2001, entitled "Method and Apparatus For a Mobile Multimedia Java Framework," which is hereby incorporated by reference. This application is also related to U.S. patent application Ser. No. 09/930,851 filed Aug. 15, 2001, and entitled "Mobile Multimedia Java Framework Application Program Interface," which is hereby incorporated by reference.

BACKGROUND OF THE INVENTION

1. Field of the Invention

This invention relates generally to multimedia frameworks, and more particularly multimedia frameworks having a reduced footprint and capable of operating on mobile computing devices.

2. Description of the Related Art

Java, originally developed by Sun Microsystems, is an object-oriented, multithreaded, portable, platform-independent, secure programming environment used to develop, test and maintain software programs. Java programs have found extensive use on the World Wide Web, which is the Internet's multimedia information retrieval system. These programs include full-featured interactive, standalone applications, as well as smaller programs, known as applets, that run in a Java-enabled Web browser or applet viewer.

Recently, the computer industry has sought to add computer processing and communications capabilities to devices other than what would normally be considered a traditional computer. Such devices are quite varied and include, for example, personal digital assistants (PDAs), smartphones, cellular phones, desktop screen phones, in-vehicle devices, vehicle traffic lights, kiosks, business organizers (e.g., IBM WorkPadT.TM., PalmPilot.TM., and the like), computer peripherals (such as printers, fax machines, and the like), handheld or palmtop computing devices, and the like. For convenience, these devices, as a class, are referred to herein as "pervasive computing" clients as they are devices that are designed to be connected to servers in a computer network and used for computing purposes regardless of their location.

Palmtop computers and the like are now being proposed as pervasive computing devices for use in an automobile. In-vehicle navigation systems, of course, are well-known. Representative systems are described in U.S. Pat. Nos.: 5,121,326, 5,191,532 and 5,792,109. U.S. Pat. No. 5,121,326 describes a navigation system that displays a general map of the driver's location. As the driver approaches an intersection, the display provides a detailed map of the intersection to provide further guidance to the driver. In U.S. Pat. No. 5,191,532, a navigation system is disclosed where driving directions can be provided even though the user's exact destination is not listed in the systems database. Certain geographic features such as cities and landmarks are used to approximate the destination for purposes of providing directions. In U.S. Pat. No. 5,729,109, the inventors provide a vehicle navigation system that uses speech generation to give spoken directions when the driver is approaching an intersection.

However, these mobile devices are often unable to run many multimedia applications. Although desktop computers are designed to handle the large processing and memory requirements of multimedia applications, most mobile computing devices do not have the processing power or memory demanded by these applications.

One reason for the large processing and memory requirements for multimedia applications is the application program interface (API) required by the underlying multimedia framework called by the applications, often 2–3 megabytes in size. The API is a language and message format used by an application program to communicate with the operating system or some other system or control program such as a database management system (DBMS) or communications protocol. APIs are implemented by writing function calls in the program, which provide the linkage to the required subroutine for execution. Thus, an API implies that some program module is available in the computer to perform the operation or that it must be linked into the existing program to perform the tasks.

FIG. 1 is a diagram showing a prior art Java media system 100. The Java media system 100 includes a desktop computer 102 having a media player 104 coupled to the Internet 106 via a network communication protocol. The processing power of desktop computer 102 is very large compared to that of a mobile computing device, such as a PDA. As such, the desktop computer 102 can efficiently play media files using the installed media player 104. However, as mentioned above, mobile computing devices such as a PDA do not have the processing power or memory requirements needed by conventional Media framework APIs and related implementations. Thus, mobile devices generally cannot run conventional media players created using conventional media framework APIs.

In view of the foregoing, there is a need for systems and methods providing mobile multimedia frameworks capable of operating on mobile computing devices. The systems and methods should provide a multimedia framework capable of operating on mobile devices having reduced processing capability, such as cell phones, PDAa, and Java-enabled car "Telematics".

SUMMARY OF THE INVENTION

Broadly speaking, the present invention fills these needs by providing a mobile multimedia framework having a reduced memory footprint. In one embodiment, a method for creating a mobile multimedia framework API capable of operation in mobile hardware devices is disclosed. All API component access parameters are set to utilize a synchronous programming model. Then, the API components are set to use a pull paradigm, and all master/slave functionality is removed. The resulting mobile multimedia framework API has a memory size of less than 100 kilobytes. To provide additional flexibility, a push data delivery protocol and an asynchronous programming model can be utilized in an application layer executing above the mobile multimedia framework API.

In another embodiment, a mobile multimedia framework API capable of operation in mobile hardware devices is disclosed. The mobile multimedia framework API includes a codec, a data source in communication with the codec, and a media engine. The media engine includes a plurality of components in communication with the codec and the data source. Each component is accessible utilizing a synchronous programming model, and also utilizes a pull data delivery protocol. Further, each component can be set to exclude master/slave functionality. As above, the resulting mobile multimedia framework API has a memory size of less than 100 kilobytes.

An additional method for creating a mobile multimedia framework API capable of operation in mobile hardware devices is disclosed in a further embodiment of the present invention. All API component access parameters are set to utilize a synchronous programming model. Then, the API components are set to use a pull paradigm, and all master/slave functionality is removed. In addition, a specialized player that is designed to process a specific type of multimedia data, such as MPEG data, is provided. In this manner, the resulting mobile multimedia framework API has a memory size of less than 100 kilobytes.

Advantageously, the embodiments of the present invention provide a mobile multimedia framework having a greatly reduced footprint. Hence, the embodiments of the present invention can be efficiently used in mobile devices having reduced processing power and memory. The memory size of the embodiments of the present invention is less than 200 kilobytes, and often less than 30 kilobytes. The actual size depending upon the functionality provided. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which:

FIG. 6A is a diagram illustrating playback interface definitions, in accordance with an embodiment of the present invention;

FIG. 6B is a diagram illustrating control definitions, in accordance with an embodiment of the present invention;

FIG. 6C is a diagram illustrating event listener definitions, in accordance with an embodiment of the present invention;

FIG. 6G is a diagram illustrating protocol handler definitions, in accordance with an embodiment of the present invention.

DETAILED DESCRIPTION OF THE PREFERRED EMBODIMENTS

An invention is disclosed for a mobile multimedia Java Framework. The present invention provides a Java based multimedia framework capable of operating on mobile devices having reduced processing capability, such as cell phones, PDAa, and Java-enabled car "Telematics". In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
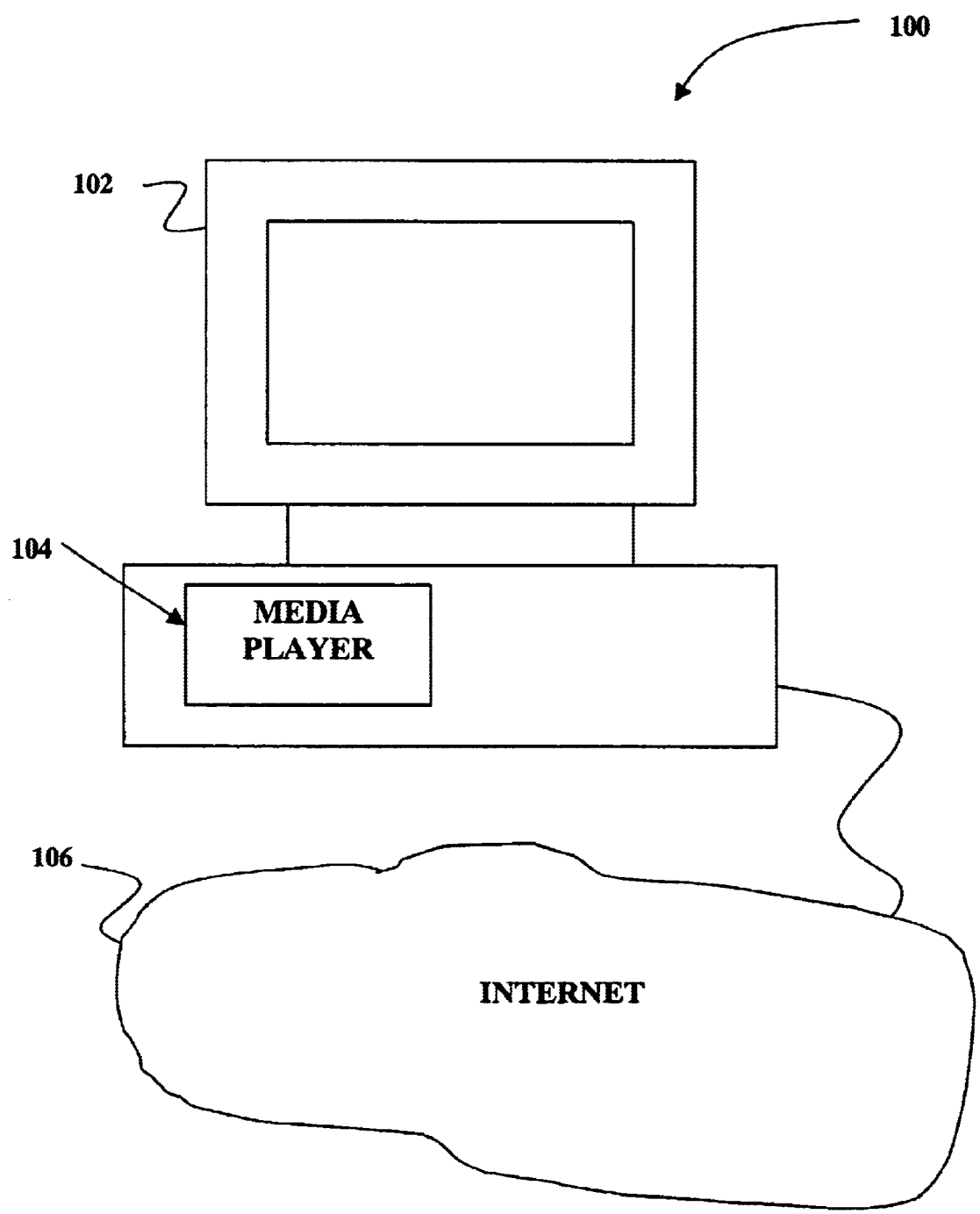
FIG. 1 is a diagram showing a prior art Java media system.
Figure 2:
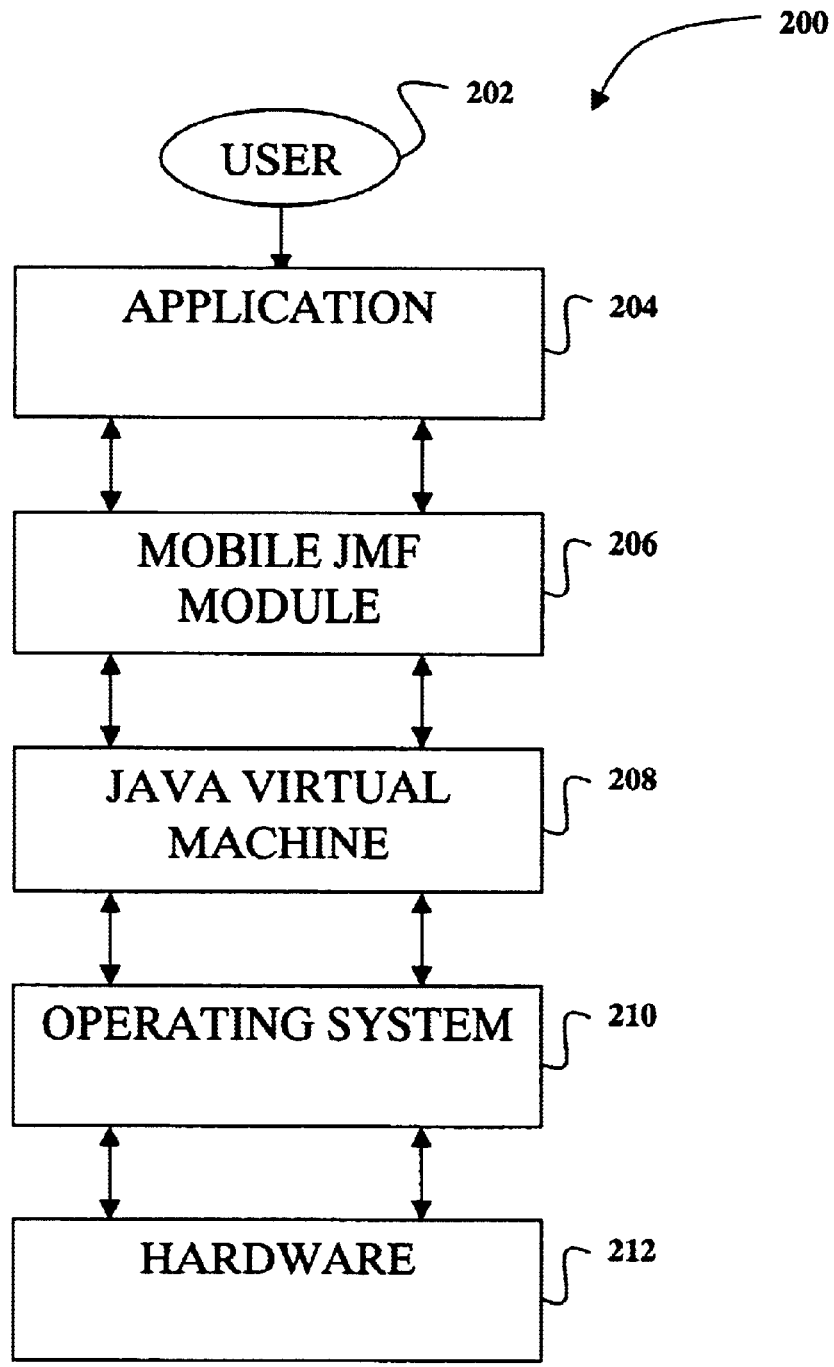
FIG. 2 is a block diagram showing the mobile multimedia framework system, in accordance with an embodiment of the present invention.

FIG. 1 was described in terms of the prior art. FIG. 2 is a block diagram showing the mobile multimedia framework system 200, in accordance with an embodiment of the present invention. The mobile multimedia framework system 200 include an application layer 204, a mobile Java multimedia framework module 206, a Java virtual machine layer 208, an operating system layer 210, and a hardware layer 212. It should be noted that other functional layers may be present to provide necessary functionality specific to the native environment, as will be apparent to those skilled in the art.

The hardware layer 212 represents the physical hardware on which the multimedia framework operates, such as a PDA or cell phone. In operation, a user 202 of the mobile multimedia system 200 interacts with the application layer 204 of the mobile multimedia system 200, which can be written by a third party developer. Generally, the application layer 204 provides the user interface for the media application, such as the play, stop, and capture controls.

The mobile Java media framework module 206 can then be used to process commands received by the application layer 204. As described in greater detail subsequently, the Java media framework module 206 includes the media engine, codec, and other media processing modules that process the commands received by the application layer 204.

The Java virtual machine 208 is used as an interpreter to provide portability to Java applications. In general, developers design Java applications as hardware independent software modules, which are executed Java virtual machines 208. The Java virtual machine layer 208 is developed to operate in conjunction with the native operating system 210 of the particular hardware 212 on which the mobile multimedia framework system 200 is to run. In this manner, Java applications 204 can be ported from one hardware device to another without requiring updating of the application code.

Unlike most programming languages, in which a program is compiled into machine-dependent, executable program code, Java classes are compiled into machine independent byte-code class files which are executed by a machine-dependent virtual machine. The virtual machine provides a level of abstraction between the machine independence of the byte-code classes and the machine-dependent instruction set of the underlying computer hardware. A class loader is responsible for loading the byte-code class files as needed, and an interpreter or just-in-time compiler provides for the transformation of byte-codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "bytecode". The bytecode is then converted (interpreted) into machine code at runtime. Upon finding a Java applet, the Web browser invokes a Java interpreter (Java Virtual Machine), which translates the bytecode into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Although the present invention is described based on the Java programming language, other programming languages may be used to implement the embodiments of the present invention, such as other object oriented programming languages. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software application can be written using an object-oriented programming language whereby the program's functionality is implemented using objects. Examples of object-oriented programming languages include C++ as well as Java.

Figure 3:
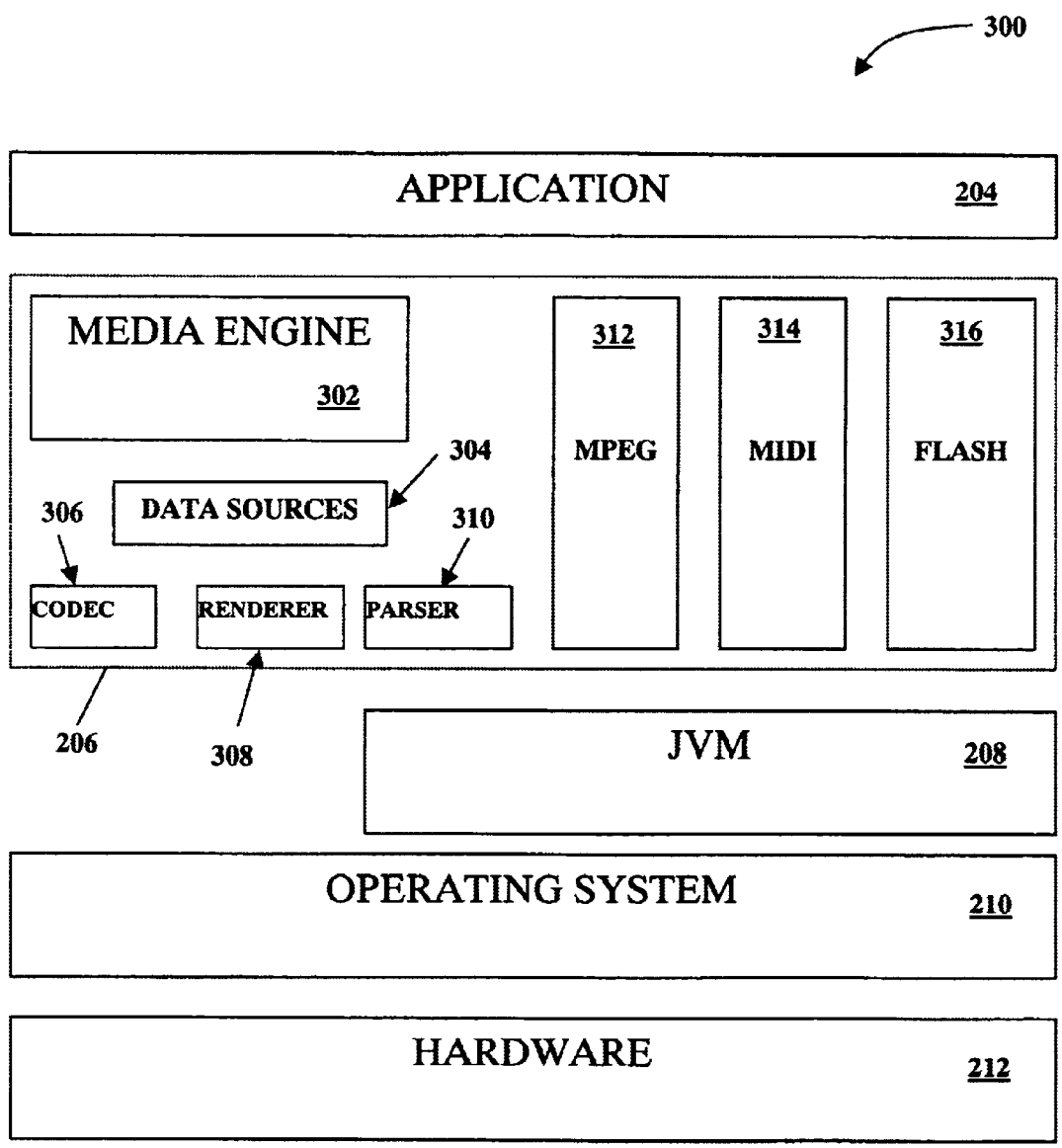
FIG. 3 is a block diagram showing a mobile multimedia framework system 300, in accordance with an embodiment of the present invention.

FIG. 3 is a block diagram showing a mobile multimedia framework system 300, in accordance with an embodiment of the present invention. The mobile multimedia framework system 300 include an application layer 204, a mobile Java multimedia framework module 206, a Java virtual machine layer 208, an operating system layer 210, and a hardware layer 212. The mobile Java multimedia framework module 206 includes a media engine 302, data sources 304, a codec 306, renderer 308, and a parser 310. Also included in the mobile Java multimedia framework module 206 is a MPEG module 312, a MIDI module 314, and a FLASH module 316. It should be noted that other media modules can be included as needed by the applications.

The a mobile Java multimedia framework module 206 is a set of multimedia APIs and implementations designed to playback multimedia in a variety of protocols and formats, such as a QuickTime Cinepak movie over the HTTP (Hypertext Transfer Protocol) protocol. The Java Media Framework specifies the concept of a "player," a unit to playback multimedia data. As illustrated in FIG. 3, within the Java multimedia framework module 206 are implementations of the three main stages of the media processing pipeline: the parser 310, the decoder 306 and the renderer 308. The parser 310 transforms the media data into a compressed and/or encoded media data file or stream. Decoder (codec) 306 transforms the compressed and/or encoded media data into raw (decompressed and unencoded) media data 305 for use by renderer 306. Renderer 306 processes the raw media data into media output for display or presentation on an output device, such as a monitor for graphics or a speaker for audio.

The mobile Java multimedia framework module 206 of the embodiments of the present invention is an order of magnitude smaller than conventional media modules. As previously mentioned, prior art media frameworks are typically 2–3 megabytes in size. Advantageously, the embodiments of the present invention, however, are less than 200 kilobytes, often less than 30 kilobytes. The actual size depending upon the functionality provided.

To reduce the size of the mobile Java multimedia framework module 206, the embodiments of the present invention optimize the operation of the framework module. To this end, an embodiment of the present invention converts all push data deliver protocols to pull data delivery protocols. In a push data delivery protocol, data is constantly provided, without needing to be requested. An example of a push data delivery protocol is a television broadcast. The television broadcast is always available, without needing to be requested. Moreover, the rate of the data delivery is controlled by the server; or the broadcast station in this example. An example of a pull data delivery protocol is a World Wide Web site. When a user enters a URL in a web browser, the user is requesting the data from the web site to be sent to the user's computer. The rate of the data delivered in the pull scenario is controlled by the client and limited by the network bandwidth. A push data delivery protocol can almost always be converted to a pull protocol (and vice versa) by means of using data buffering and adding an additional processing thread to control the data flow. Hence the push data protocol can be eliminated from the framework as a size reduction measure without sacrificing any necessary functionalities. Thus, the embodiments of the present invention convert all data delivery to a pull data delivery protocol.

The embodiments of the present invention also remove the master/slave paradigm to reduce the size of the mobile Java multimedia framework module 206. It should be noted, however, that master/slave paradigms between program modules can still be created at the application level 204. Thus, the embodiments of the present invention move the master/slave relationship functionality from the mobile Java multimedia framework module 206 to the application layer 204, resulting in a reduction of the mobile Java multimedia framework module 206 size. Moreover, most media content displayed using the mobile Java multimedia framework module 206 includes both audio and video if they are to be run together. In other words, most media is not separated. However, when the master/slave paradigm is needed, such as when the audio and video are separated, the master/slave paradigm can be provided at the application level 204.

The embodiments of the present invention further convert all asynchronous operations into synchronous operations to reduce the size of the mobile Java multimedia framework module 206. An example of an asynchronous operation is an email request. When a user sends email, the user can continue with other operations while awaiting a reply to the email. The user is not prevented from performing further operations on their computer until the reply is received. An example of a synchronous operation is a telephone call. During a telephone call the user waits for an immediate reply to the call.

From a programming point of view, if a start video function is called, two separate events occur under the asynchronous and synchronous models. Using an asynchronous model, the start video function would immediately return and a listener function would execute. The listener function would provide an event that informs the program that video has started. However, during the time the listener function is awaiting the video start, the module calling the start video function can continue executing other operations. Using a synchronous model, the start video call would stop operation of the calling module until the video is actually started.

The asynchronous model is appropriate when delays are expected during operation of the system, such as when setup operations are required to execute the modules. The synchronous model is appropriate when delays are not expected, or are of short duration. Since mobile devices are generally design to respond quickly with little delay, the embodiments of the present invention preferably do not utilize an asynchronous module to implement the mobile Java multimedia framework module 206. However, an asynchronous module can be used at the application layer 204, similar to the master/slave paradigm.

As mentioned above the mobile Java multimedia framework module 206 includes a media engine 302 that uses the data sources 304, codec 306, renderer 308, and parser 310 to process media provided by the application layer 204. In addition, specialized players are included, such as an MPEG player 312, MIDI player 314, and FLASH player 316. It should be noted that other specialize players may be included in the mobile Java multimedia framework module 206, desired by the developer.

The media engine 302 is used as a generic media data processor, while the specialized players are used to process data specific to the particular specialized player. For example, in the system 300 of FIG. 3, all MPEG media is processed using the MPEG player 312. Each specialized player includes its own specialized media engine, parser, codec, and render optimized to process MPEG media.

Below the mobile Java multimedia framework module 206 is a Java virtual machine (JVM) 208. In some embodiments of the present invention portions of the mobile Java multimedia framework module 206, such as the codec 306, can bypass the JVM 208 and interface directly the native operating system 210, which interfaces with the native hardware 212. This allows for increased speed and efficiency when needed.

Figure 4:
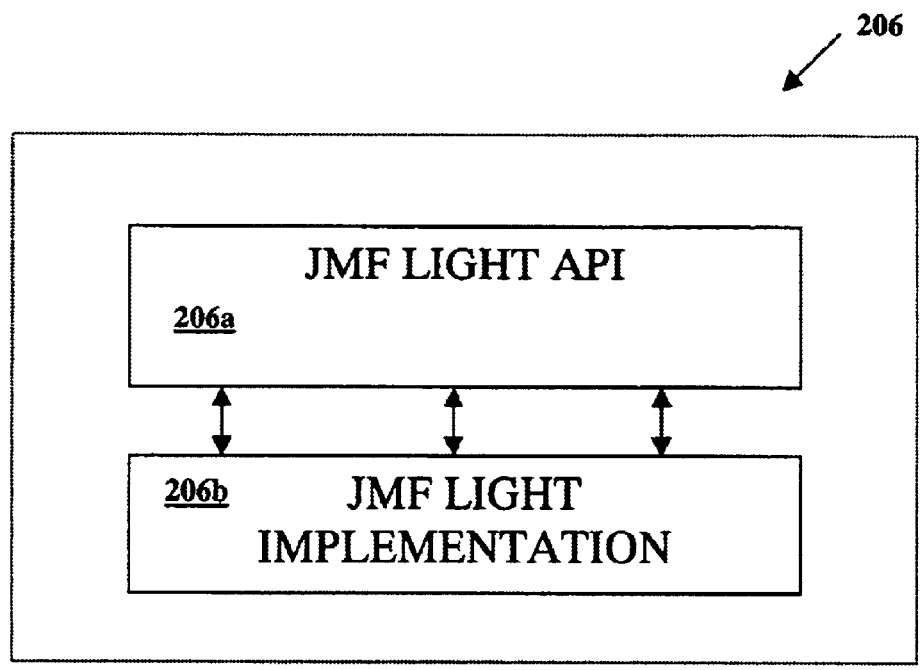
FIG. 4 is an interface block diagram showing a mobile Java multimedia framework module, in accordance with an embodiment of the present invention.

FIG. 4 is an interface block diagram showing a mobile Java multimedia framework module 206, in accordance with an embodiment of the present invention. The interface diagram of FIG. 4 illustrates the programming interface for the mobile Java multimedia framework module 206. More specifically, the mobile Java multimedia framework module 206 includes a Java media framework (JMF) light application programming interface 206a and a JMF light implementation module 206b.

The mobile Java multimedia framework module 206 is developed in an independent piecewise manner by establishing the JMF light application programming interface (API) for components of the JMF light implementation module 206b. The JMF light API 206a refers to the methods of the JMF light implementation module 206b that are accessible by the applications executing on the application layer. The JMF light API 206a further defines the format by which those methods are invoked. The particular implementation of those methods is important only with respect to the design of the particular component. Each component of the JMF light implementation module 206b is designed individually to implement the JMF light API 206a and any internal functions, and to interface with the APIs of the other components of the application. Typically, these components comprise one or more objects forming the application.

Figure 5:
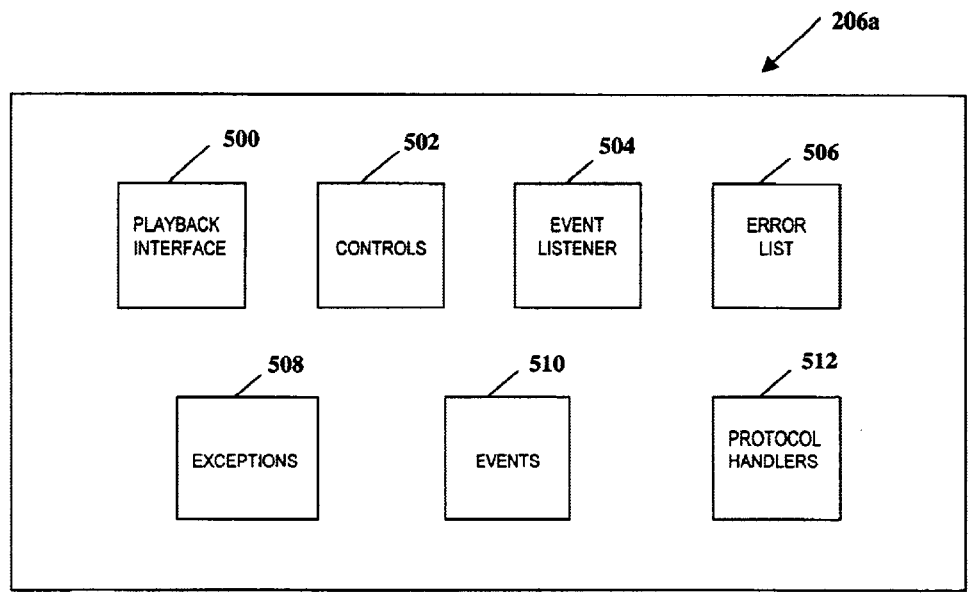
FIG. 5 is a block diagram showing an exemplary JMF light API, in accordance with an embodiment of the present invention.

FIG. 5 is a block diagram showing an exemplary JMF light API 206a, in accordance with an embodiment of the present invention. The JMF light API 206a includes format definitions for a plurality of methods accessible by applications using the JMF light API 206a. For example, the JMF light API 206a includes playback interface definitions 500, control definitions 502, event listener definitions 504, error list definitions 506, exception definitions 508, event definitions 510, and protocol handler definitions 512. These definitions define the format by which those methods are invoked by applications. As mentioned above, each component of the JMF light implementation module 206b is designed individually to implement the JMF light API 206a and any internal functions, and to interface with the APIs of the other components of the application. Typically, these components comprise one or more objects forming the application.

The Playback interface 500 is the top-level entry point to the API. It provides functions to create a Player object and the implementation of the various media Players. The player implementations provide the methods to control the basic playback functions, such as start, stop, and set media time. The Control interface 502 provides objects to control other advance playback functions. Examples of such functions are controlling audio gain, data caching, and video frame stepping.

The Event Listener interface 504 provides the objects to receive update events from the players. The Error List interface 506 contains the definition of the error classes, and the Exceptions interface 508 contains the definition of the exception classes. The Events interface 510 contains the definition of the event classes, while the Protocol Handler interface 514 provides the classes to handle the data delivery protocols.

FIGS. 6A–6G illustrate an exemplary JMF light API 206a, in accordance with an embodiment of the present invention. The MIDP prototype is an exemplary JMF light implementation. FIGS. 6A–6G list the API definitions of the multimedia framework. Applications use these classes to create and control media playback. Additional implementation classes can be used to support the API by providing playback for Wave and MP3 audio files, QuickTime and MPEG-4 video files and Flash media formats.

FIG. 6A is a diagram illustrating playback interface definitions 500, in accordance with an embodiment of the present invention. In particular, the Manager.java API definition is a top-level class to manage and create media Players. PackageManager.java stores and maintains the package prefixes to find the media Players, and Player.java is the media Player interface. The time.java definition defines the time object, and TimeBase.java defines the time base for synchronizing the media presentation. SystemTimeBase.java is the time base implemented using the system clock, and MediaLocator.java is the interface to specify the location of the media.

FIG. 6B is a diagram illustrating control definitions 502, in accordance with an embodiment of the present invention. In the control definitions 502, Control.java is a base class for all control types, while Controls.java is a base class for all objects that support advance controls. Regarding the actual controls, CachingControl.java is a control for caching, and GainControl.java is a control for audio gain.

FIG. 6C is a diagram illustrating event listener definitions 504, in accordance with an embodiment of the present invention. The event listener definitions 504 include PlayerListener.java, which is an event listener for the Player, and GainChangeListener.java, which is a listener for gain change events.

Figure 6D:
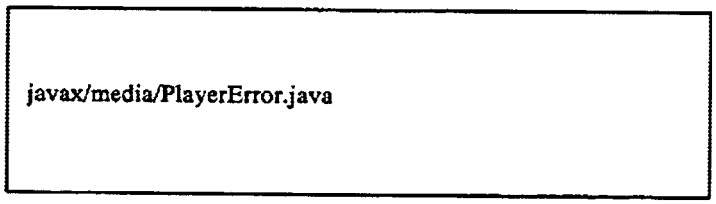
FIG. 6D is a diagram illustrating error list definitions, in accordance with an embodiment of the present invention.
Figure 6E:
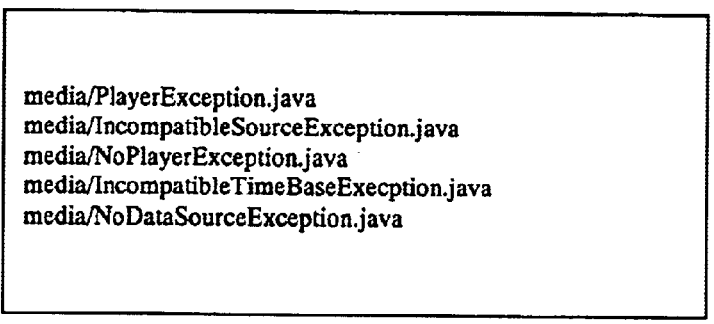
FIG. 6E is a diagram illustrating exception definitions, in accordance with an embodiment of the present invention.

FIG. 6D is a diagram illustrating error list definitions 506, in accordance with an embodiment of the present invention. As shown in FIG. 6D, the error list definitions 506 includes PlayerError.java, which are the errors generated by the Player. Similarly, FIG. 6E is a diagram illustrating exception definitions 508, in accordance with an embodiment of the present invention. PlayerException.java is a base class for the following Player exceptions. IncompatibleTimeBaseException.java is an exception generated by an incompatible time base is used, NoPlayerException.java is an exception when no player can be found for the given media, and NoDataSource.java is an exception when no DataSource can be found for the given media.

Figure 6F:
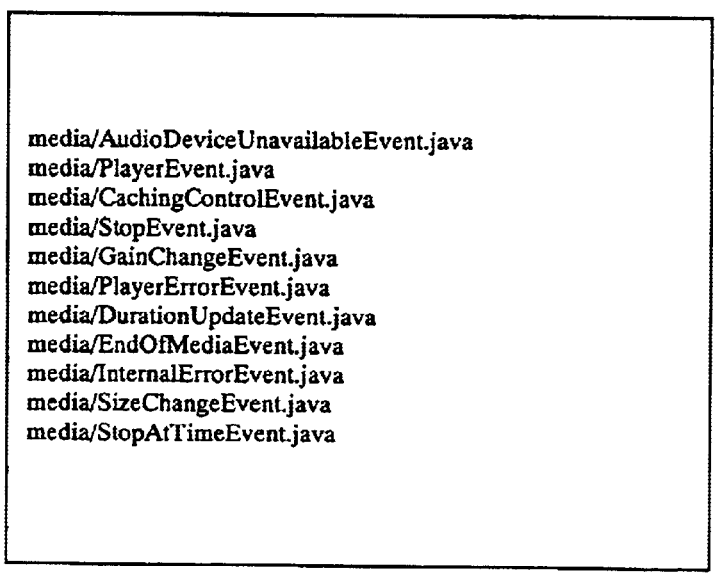
FIG. 6F is a diagram illustrating event definitions, in accordance with an embodiment of the present invention.

FIG. 6F is a diagram illustrating event definitions 510, in accordance with an embodiment of the present invention. The event definitions 510 include AudioDeviceUnvailableEvent.java, which is an event when the audio device is not available, PlayerEvent.java, which is a base class for all player events, and CachingControlEvent.java, which are events for caching. Further events included in the event definitions 510 is StopEvent.java, which is an event when the player is stopped, GainChangeEven.java, which is an event when the audio gain is changed, PlayerErrorEvent.java, which is an event when an error occurs in the player, and DurationUpdateEvent.java, which is an event when the duration is updated. In addition, The EndOfMediaEvent.java is an event when End of Media occurs, InternalErrorEvent.java is an event when an internal error occurs, SizeChangeEvent.java is an event when the video size is changed, and StopAtTimeEvent.java is an event when the player is stopped due to a preset stop time.

FIG. 6G is a diagram illustrating protocol handler definitions 512, in accordance with an embodiment of the present invention. The protocol handler definitions 512 include Seekable.java, which is an interface for seekable type of DataSource, DataSource.java, which is a class to read data from, ContentDescriptor.java, which describes the data type, and SourceStream.java, which is an abstraction of a data stream inside a DataSource.

Figure 7:
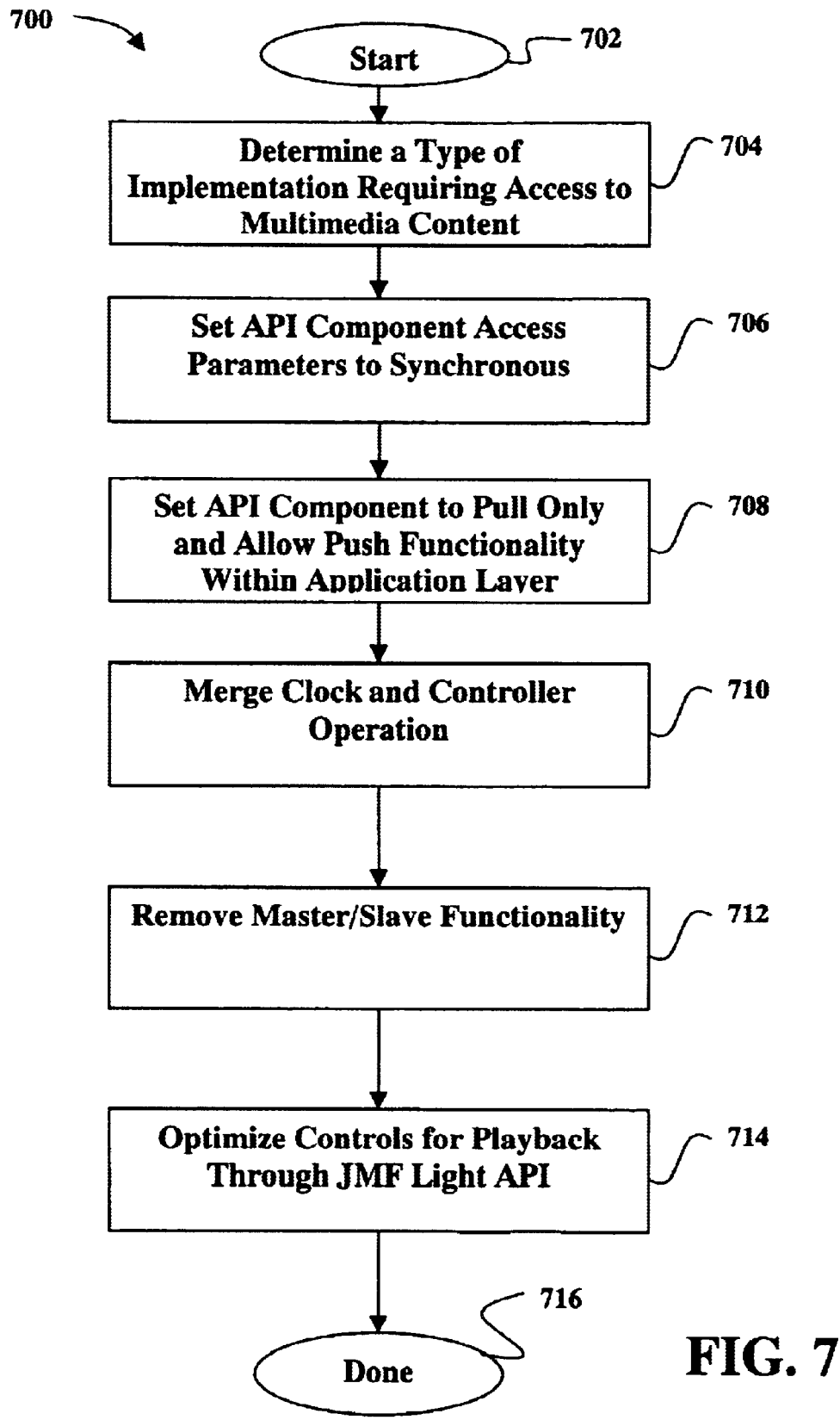
FIG. 7 is a flowchart showing a method for creating a JMF light API, in accordance with an embodiment of the present invention.

FIG. 7 is a flowchart showing a method 700 for creating a JMF light API, in accordance with an embodiment of the present invention. In an initial operation 702, preprocess operations are performed. Preprocess operations include determining a programming language in which to implement the JMF light API and other preprocess operations that will be apparent to those skilled in the art.

In operation 704, a type of implementation requiring access to multimedia content is determined. To design the API, the general type of hardware on which the API will operate is determined. This includes determining the amount of memory and processing power that will be available for use by the API, the API implementation, and the application using the API.

Next, in operation 706, the API component access parameters are set to synchronous. As mentioned above, the embodiments of the present invention convert all asynchronous operations into synchronous operations to reduce the size of the mobile Java multimedia framework module. The asynchronous model is appropriate when delays are expected during operation of the system, such as when setup operations are required to execute the modules. The synchronous model is appropriate when delays are not expected, or are of short duration. Since mobile devices are generally design to respond quickly with little delay, the embodiments of the present invention preferably do not utilize an asynchronous module to implement the mobile Java multimedia framework module. However, an asynchronous module can be used at the application layer.

In operation 708, the API components are set to pull only. The embodiments of the present invention convert push data deliver protocols to pull data delivery protocols. In a push data delivery protocol, data is constantly provided, without needing to be requested. Thus, the embodiments of the present invention convert all data delivery to a pull data delivery protocol to further reduce the size of the JMF light API.

In operation 710, master/slave functionality is removed from the components of the JMF API. The embodiments of the present invention also remove master/slave paradigm to reduce the size of the mobile Java multimedia framework module. It should be noted, however, that master/slave paradigms between program modules can still be created at the application level. Thus, the embodiments of the present invention move the master/slave relationship functionality from the mobile Java multimedia framework module to the application layer, resulting in a reduction of the mobile Java multimedia framework module size. Moreover, most media content displayed using the mobile Java multimedia framework module includes both audio and video if they are to be run together. In other words, most media is not separated. However, when the master/slave paradigm is needed, such as when the audio and video are separated, the master/slave paradigm can be provided at the application level.

The controls for playback are then optimized in operation 712. Preferably the set of controls included in the framework is reduced to a small set of controls that are directly related to playback on small devices. These include audio gain, caching and video frame positioning controls.

Post process operations are performed in operation 716. Post process operations include installing the completed API on the native hardware and other post process operations that will be apparent to those skilled in the art. Advantageously, the embodiments of the present invention provide a mobile multimedia framework having a greatly reduced footprint. Hence, the embodiments of the present invention can be efficiently used in mobile devices having reduced processing power and memory.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for creating a mobile multimedia framework application programming interface (API) capable of operation in mobile hardware devices, comprising the operations of:

setting API component access parameters to utilize a synchronous programming model;

setting API components to a pull data delivery protocol; and removing master/slave functionality from the API components, the master/slave functionality being only utilized in an application layer.

2. A method as recited in claim 1, wherein a memory size of the mobile multimedia framework API is less than 100 kilobytes.

3. A method as recited in claim 1, wherein a push data delivery protocol is only utilized in an application layer.

4. A method as recited in claim 1, wherein an asynchronous programming model is only utilized in an application layer.

5. A method as recited in claim 1, further comprising the operation of providing specialized players.

6. A method as recited in claim 5, wherein the specialized players include an MPEG player.

7. A mobile multimedia framework application programming interface (API) capable of operation in mobile hardware devices, comprising:

a codec;

a data source in communication with the codec; and a media engine having a plurality of components in communication with the codec and the data source, wherein each component is accessible utilizing a synchronous programming model, wherein each component utilizes a pull data delivery protocol, wherein each component is set to exclude master/slave functionality, and wherein the master/slave functionality is utilized in an application layer.

8. A mobile multimedia framework API as recited in claim 7, wherein a memory size of the mobile multimedia framework API is less than 100 kilobytes.

9. A mobile multimedia framework API as recited in claim 7, wherein a push data delivery protocol is only utilized in an application layer.

10. A mobile multimedia framework API as recited in claim 9, wherein an asynchronous programming model is only utilized in an application layer.

11. A mobile multimedia framework API as recited in claim 7, further comprising specialized players.

12. A mobile multimedia framework API as recited in claim 11, wherein the specialized players include an MPEG player.

13. A method for creating a mobile multimedia framework application programming interface (API) capable of operation in mobile hardware devices, comprising the operations of:

setting API component access parameters to utilize a synchronous programming model;

setting API components to a pull data delivery protocol;

removing master/slave functionality from the API components, the master/slave functionality being only utilized in an application layer; and providing a specialized player, wherein the specialized player is designed to process a specific type of multimedia data, wherein a memory size of the mobile multimedia framework API is less than 100 kilobytes.

14. A method as recited in claim 13, wherein a push data delivery protocol is only utilized in an application layer.

15. A method as recited in claim 14, wherein an asynchronous programming model is only utilized in an application layer.

16. A method as recited in claim 13, wherein the specialized player is an MPEG player.

* * * * *